(12) United States Patent
Musetti

(10) Patent No.: US 6,459,841 B1
(45) Date of Patent: Oct. 1, 2002

(54) OPTICAL FIBER MANAGEMENT TOOL

(75) Inventor: Robert Musetti, Cupertino, CA (US)

(73) Assignee: Ciena Corporation, Dinthicum, MD (US)

( * ) Notice: Subject to any disclaimer, the term of this patent is extended or adjusted under 35 U.S.C. 154(b) by 0 days.

(21) Appl. No.: 09/587,020

(22) Filed: Jun. 5, 2000

Related U.S. Application Data

(60) Provisional application No. 60/137,845, filed on Jun. 7, 1999.

(51) Int. Cl.[7] .................................................. G02B 6/00
(52) U.S. Cl. ......................................... 385/134; 385/135
(58) Field of Search ............................ 385/134, 135–37

(56) References Cited

U.S. PATENT DOCUMENTS

| | | | | |
|---|---|---|---|---|
| 4,861,134 A | * | 8/1989 | Alameel et al. ............. | 385/135 |
| 5,237,640 A | | 8/1993 | Pedraza et al. ............. | 385/136 |
| 5,353,367 A | | 10/1994 | Czosnowski et al. ....... | 385/135 |
| 5,383,051 A | | 1/1995 | Delrosso et al. ............ | 359/341 |
| 5,469,526 A | | 11/1995 | Rawlings ..................... | 385/135 |
| 5,740,300 A | | 4/1998 | Hodge ......................... | 385/135 |
| 5,774,617 A | * | 6/1998 | Stockman et al. ........... | 385/134 |
| 5,907,654 A | | 5/1999 | Render et al. .............. | 385/135 |
| 5,987,207 A | * | 11/1999 | Hoke .......................... | 385/135 |
| 6,132,104 A | * | 10/2000 | Bliss et al. .................. | 385/53 |

FOREIGN PATENT DOCUMENTS

EP  0349207  1/1990  ...................... 6/42

\* cited by examiner

*Primary Examiner*—Neil Abrams
*Assistant Examiner*—Brian S. Webb
(74) *Attorney, Agent, or Firm*—David L. Soltz

(57) ABSTRACT

Consistent with the present invention, an optical fiber management tool is provided which is attachable to a component board or module. The tool has curved or arcuate portions defining a passage for accommodating an optical fiber, and securing the fiber at a bend radius which is greater than the minimum bend radius of the fiber. The tool further has a handle so that the component board can be readily inserted into or removed from a shelf without breaking the fiber.

26 Claims, 4 Drawing Sheets

OPTICAL FIBER MANAGEMENT TOOL

The present application claims the benefit of U.S. Provision Patent Application Serial No. 60/137,845, filed Jun. 7, 1999.

The present invention is directed toward a fiber optic management tool attachable to an optical component, and having a handle for manipulating the optical component.

BACKGROUND OF THE INVENTION

Optical communication equipment is typically housed in bays, which include a rectangular frame having dimensions conforming to a particular standard, such as the Network Equipment Building Standard (NEBS). The frame further typically has a plurality of shelves, each having one or more slots for accommodating circuit boards or cards which have optical and electrical components associated with a communication network mounted thereon. The components include, but are not necessarily limited to lasers, photodetectors, optical amplifiers, switching elements, add/drop multiplexers etc. In addition, optical fibers typically connect to one or more component.

If a network component requires maintenance or an upgrade, the card containing the component or a component module is typically removed from the shelf. Optical fibers connected to the component board or module often remain attached thereto during removal. However, since optical fibers are typically brittle, if the fiber is bent beyond a particular bend radius during board or module removal, the fiber may break. Accordingly, removal and insertion of component boards or modules can be difficult and inconvenient.

SUMMARY OF THE INVENTION

Consistent with the present invention, an optical fiber management tool is provided which comprises a base portion having first and second arcuate members disposed thereon. The first and second arcuate members define a passage, which is configured to accommodate an optical fiber, whereby the optical fiber is bent in the passage. A radius associated with the bent optical fiber exceeds a minimum bend radius of the optical fiber. The optical fiber management tool further comprises a protruding member extending from the base portion to permit manual grasping of said optical fiber management tool while maintaining the radius associated with said bent optical fiber.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Consistent with the present invention, an optical fiber management tool is provided which is attachable to a component board or module. The tool has curved or arcuate portions defining a passage for accommodating an optical fiber, and securing the fiber at a bend radius which is greater than the minimum bend radius of the fiber. The tool further has a handle so that the component board can be readily inserted into or removed from a shelf without breaking the fiber.

Figure 1:
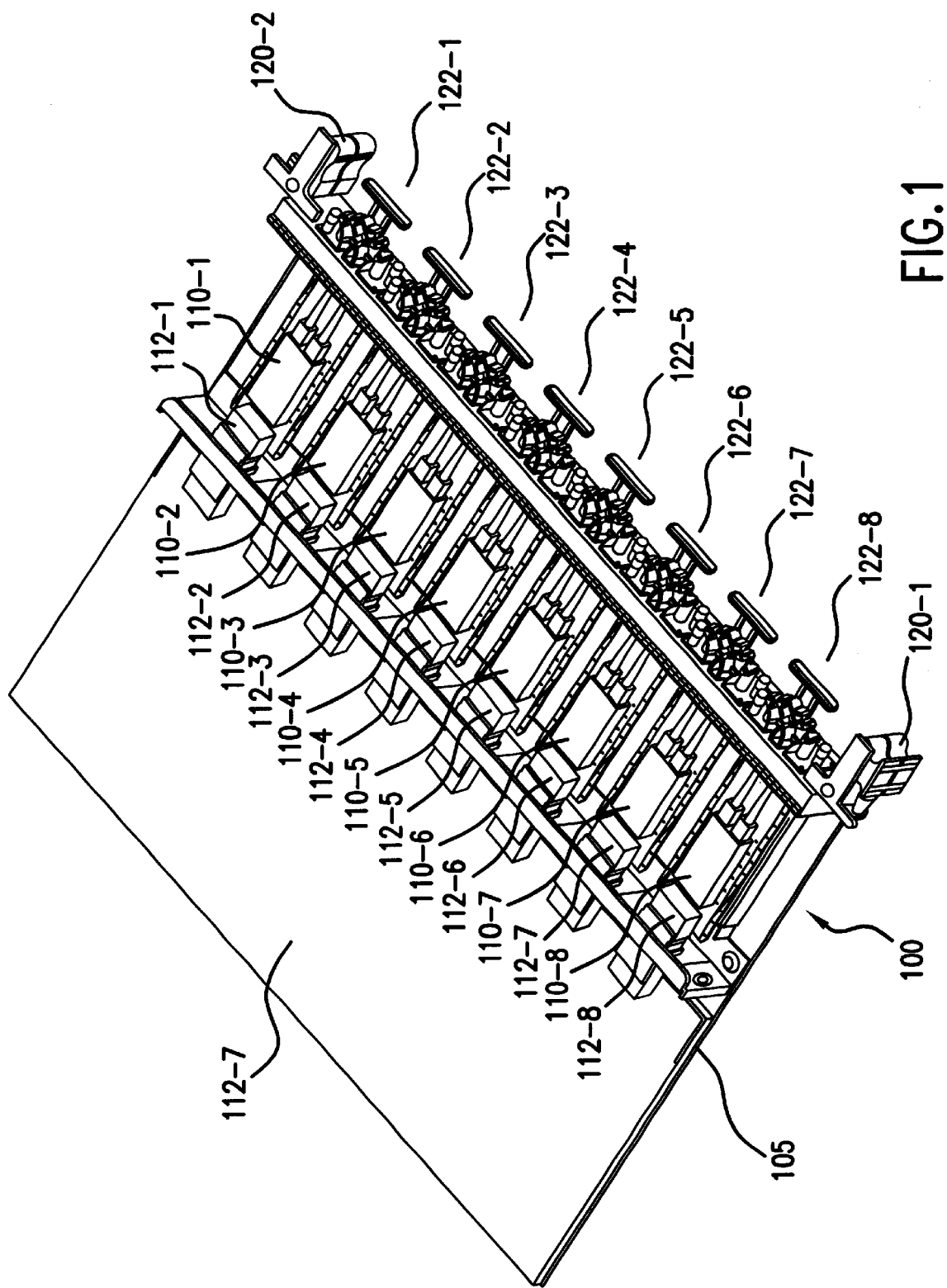
FIG. 1 illustrates a component board including optical fiber management tools consistent with the present invention.

Turning to the drawings in which like reference characters indicate the same or similar elements in each of the several views, FIG. 1 illustrates a component board 100 having mounting members 120-1 and 120-2 optionally provided to mount board 100 to a shelf. Component board 100 includes a circuit board 105 upon which modules 110-1 to 110-8 are mounted. Each of modules 110-1 to 110-8 includes, for example, at least one optical component, and is coupled to a corresponding one of electronic modules 112-1 to 112-8, for forwarding and/or processing electronic signals to/from modules 110-1 to 110-8. Modules 110-1 to 110-8 are further coupled to a corresponding one of optical fiber management tools 122-1 to 122-8.

Figure 2:
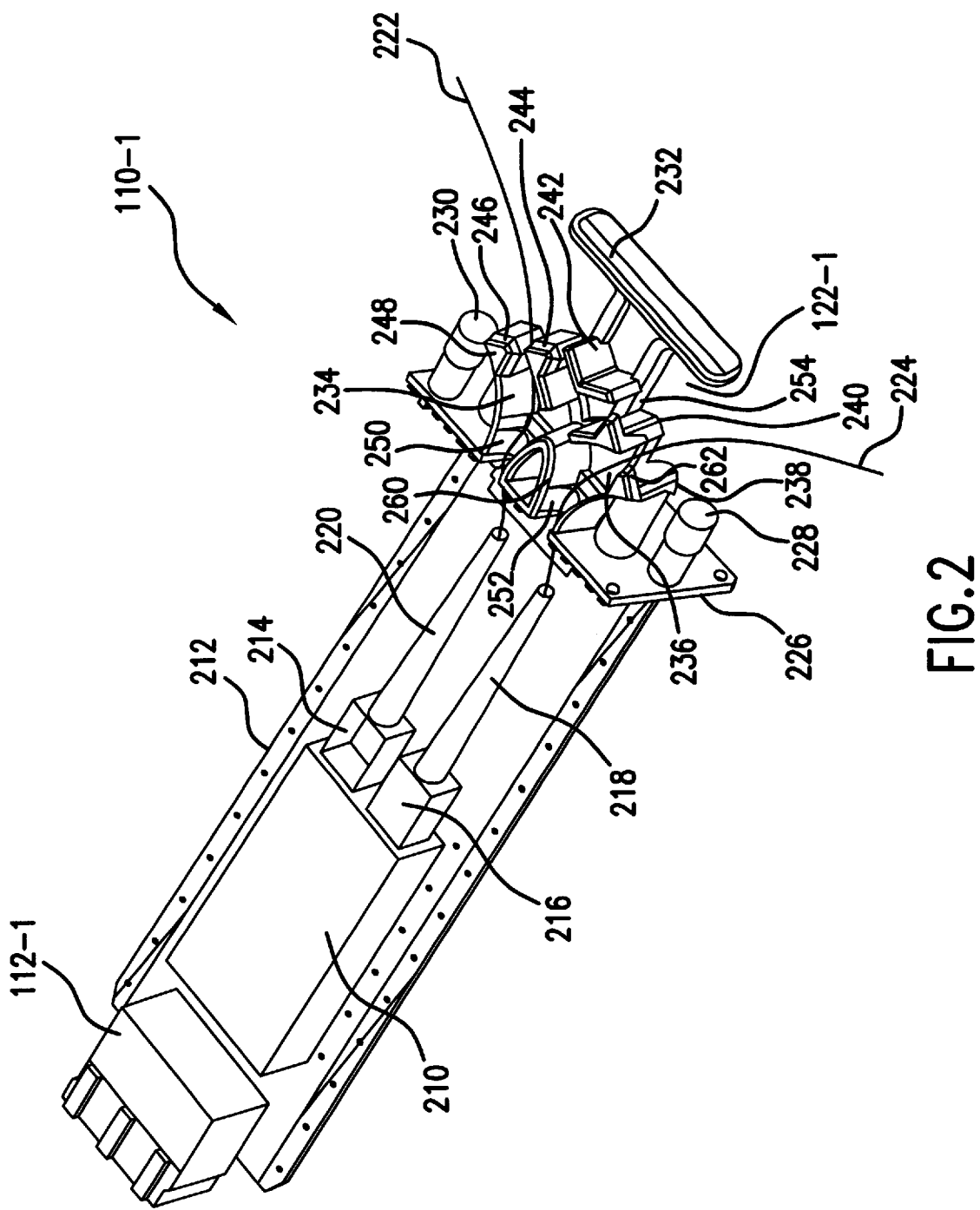
FIG. 2 illustrates an optical module attachable to the optical fiber management tool.
Figure 3:
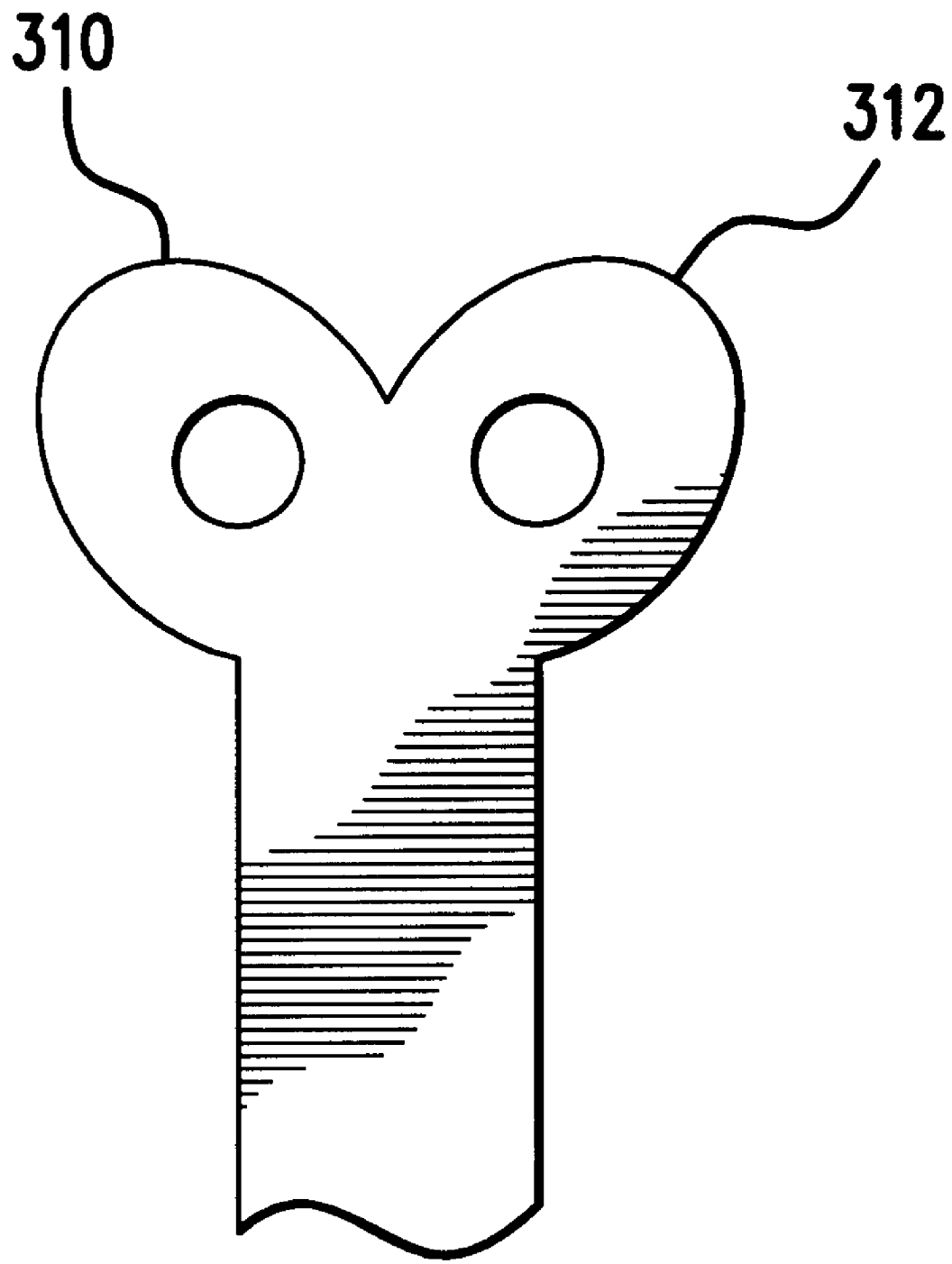
FIG. 3 illustrates an alternative handle for the optical fiber management tool.

FIG. 2 illustrates one of exemplary modules 110-1 to 110-8 in greater detail. Module 110-1, for example, includes transmission/receiver circuitry 210 disposed on a substrate 212 along with laser and photodetector modules 214 and 216, respectively. Circuitry 210 includes components for generating electrical signals for driving laser 214, and sensing electrical signals output from photodector 216. Laser 214 supplies optical signals to fiber 222, while optical fiber 224 feeds optical signals to photodetector 216. Conventional "boots" 218 and 220 typically include semi-rigid plastic portions for securing fibers 224 and 222, respectively.

As further shown in FIG. 2, fibers 222 and 224 are fed through fiber management tool 122-1, which is secured to substrate 212 through screws or fasteners 228 and 230. Tool 122-1 includes a base portion 254 upon which arcuate portions 246, 244, 238, 240 and 260 are formed. A guide member 242 is also formed on base portion 254. Arcuate portions 238 and 240, for example, define a channel 236 through which fiber 224 is disposed, while arcuate portions 244 and 246 define channel 234. Fibers 222 and 224 are bent within channels 234 and 236, respectively, and have an associated radius, which exceeds the minimum bend radius of these fibers. Projections portions 248, 252, 250, 244 and 262, for example, assist in maintaining fibers within a particular channel.

Protruding member 232 includes handle 232, which can be manually grasped for readily removing and/or inserting module 110-1 into a corresponding place on board 105. FIG. 2 illustrates handle 232 being substantially T-shaped. Alternatively, the handle may include first and second looped portions 310 and 312, respectively, for accommodating a user's fingers. The combination of handle 232 with the above-described arcuate portions provides access to modules while maintaining appropriate bend radii of attached fibers.

In addition, a conductive portion 226 is optionally attached to tool 122-1 in order to shield laser 214, photodetector 216 and circuitry 210 from radio frequency (RF) or other electromagnetic radiation.

Figure 4:
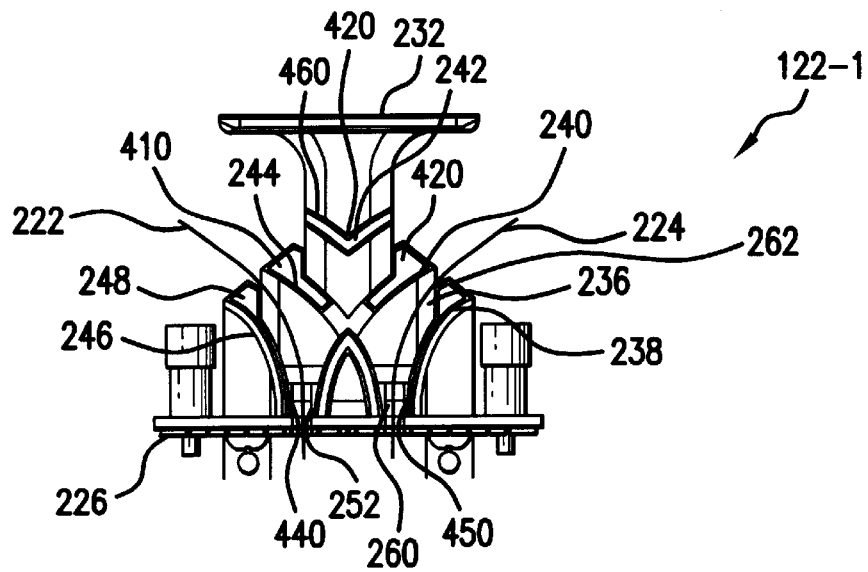
FIGS. 4, 5 and 6 illustrate top, bottom and side views, respectively, of the optical fiber management tool.

FIG. 4 illustrates a top view of tool 122-1, showing further projection portions 410, 420, 440, 450 and 460 for securing optical fibers. In the particular example, shown in FIGS. 2 and 4, fibers 222 and 224 are disposed in different directions. However, fiber 222 could be fed along a part of portion 260 and through a channel or passage defined by guiding member 242 and arcuate portion 240. In which case, both fibers 222 and 224 would exit tool 122-1 in the same direction, i.e., to the right in FIG. 4. Moreover, fiber 224 could be fed along an opposite part of portion 260 and through a channel defined by guiding member 242 and arcuate portion 244. As a result, fibers 222 and 224 would exit tool 122-1 to the left in FIG. 4.

Figure 5:
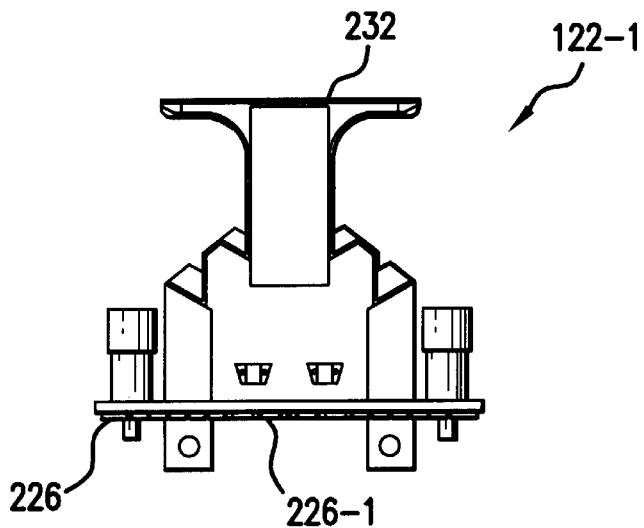
Figure 6:
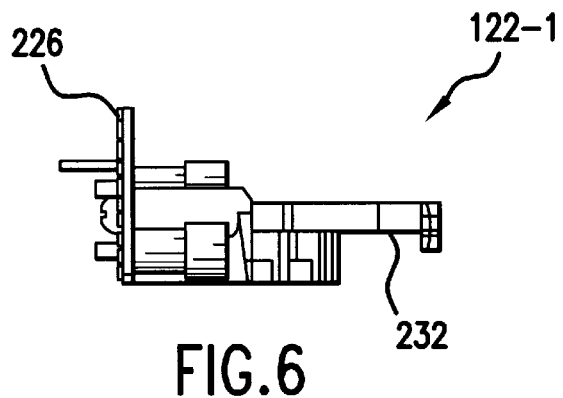

FIGS. 5 and 6 illustrate bottom and side views of tool 122-1. In particular, as seen in FIGS. 5 and 6, as well as FIGS. 2 and 4, conductive member 226 includes a plurality of resilient portions 226-1 for contacting the conductive portion to a ground conductor on substrate 212. Accordingly, adequate electromagnetic shielding can be obtained.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical fiber management tool adapted to be coupled to a first end of a component board having a faceplate, the optical fiber management tool, comprising:
   a base portion adapted to be coupled to a surface of the faceplate, wherein the surface is external to the component board;
   a first arcuate member disposed on said base portion;
   a second arcuate member disposed on said base portion and spaced from said first arcuate member, said first and second arcuate members defining a passage, said passage being configured to accommodate an optical fiber, whereby said optical fiber is bent in said passage, a radius associated with said bent optical fiber exceeding a minimum bend radius of said optical fiber; and
   a protruding member extending from said base portion to permit manual grasping of said optical fiber management tool while maintaining said radius associated with said bent optical fiber.

2. An optical fiber management tool in accordance with claim 1, wherein said protruding member comprises a T-shaped portion.

3. An optical fiber management tool in accordance with claim 1, wherein said protruding member comprises first and second looped portions.

4. An optical fiber management tool in accordance with claim 1, further comprising a conductive portion attached to said base portion.

5. An optical fiber management tool in accordance with claim 1, further comprising:
   a third arcuate member provided on said base portion; and
   a fourth arcuate member provided on said base portion and spaced from said third arcuate member, said third and fourth arcuate members defining an additional passage, said additional passage being configured to accommodate an additional optical fiber, whereby said additional optical fiber is bent in said additional passage, a radius associated with said bent additional optical fiber exceeding said minimum bend radius.

6. An optical fiber management tool in accordance with claim 5, wherein said additional optical fiber is bent away from said optical fiber.

7. An optical fiber management tool in accordance with claim 5, wherein said additional optical fiber is bent in substantially the same direction as said optical fiber.

8. An optical fiber management tool in accordance with claim 5, further comprising:
   first and second projection portions extending from said first and second arcuate members, respectively, said first and second projection portions being configured to maintain said optical fiber within said passage; and
   third and fourth projection portions extending from said third and fourth arcuate members, respectively, said third and fourth projection portions being configured to maintain said additional optical fiber within said additional passage.

9. An optical fiber management tool in accordance with claim 1, further comprising:
   a projection portion extending from first arcuate member, said projection portion being configured to maintain said optical fiber within said passage.

10. An optical fiber management tool in accordance with claim 1, wherein the passage is further configured to direct the optical fiber across a portion of the faceplate.

11. An optical device, coupled to a first optical fiber and a second optical fiber, the optical device comprising:
    a substrate including a first end;
    a faceplate, coupled to said first end of said substrate, the faceplate including a first side and an opposing second side,
    wherein said faceplate includes at least one opening,
    wherein said first side faces away from said substrate and
    wherein said opposing second side faces toward said substrate;
    an optical emitter provided on said substrate, wherein said optical emitter is coupled to a first end of the first optical fiber;
    an optical receiver provided on said substrate, wherein said optical receiver is coupled to a first end of the second optical fiber; and
    an optical fiber management tool coupled to the first side of said faceplate, said optical fiber management tool including first and second guiding portions configured to respectively direct the first optical fiber and the second optical fiber each through one of said at least one opening.

12. An optical device in accordance with claim 10, wherein said first guiding portion comprises:
    a base portion;
    a first arcuate member provided on said base portion;
    a second arcuate member provided on said base portion and spaced from said first arcuate member, said first and second arcuate members defining a passage, said passage accommodating said first optical fiber.

13. An optical device in accordance with claim 12, wherein said first optical fiber is bent about a radius exceeding a minimum bend radius associated with said first optical fiber.

14. An optical device in accordance with claim 12, further comprising:
    a third arcuate member provided on said base portion; and
    a fourth arcuate member provided on said base portion and spaced from said third arcuate member, said third and fourth arcuate members defining an additional passage, said additional passage accommodating said second optical fiber.

15. An optical device in accordance with claim 14, wherein said second optical fiber is bent about a radius exceeding a minimum bend radius associated with said second optical fiber.

16. An optical device in accordance with claim 12, further comprising:
    first and second projection portions extending from said first and second arcuate members, respectively, said first and second projection portions being configured to maintain said first optical fiber within said passage.

17. An optical device in accordance with claim 14, further comprising:
first and second projection portions extending from said first and second arcuate members, respectively, said first and second projection portions being configured to maintain said first optical fiber within said passage; and
third and fourth projection portions extending from said third and fourth arcuate members, respectively, said third and fourth projection portions being configured to maintain said second optical fiber within said additional passage.

18. An optical device in accordance with claim 11, further comprising a conductive portion coupled between said optical fiber management tool and said substrate to thereby permit electromagnetic shielding of said optical emitter and said optical receiver.

19. An optical device in accordance with claim 11 wherein the optical fiber management tool further includes a handle configured to permit manual grasping of said optical fiber management tool.

20. An optical device in accordance with claim 19, wherein said handle includes a T-shaped portion.

21. An optical device in accordance with claim 19, wherein said handle includes first and second looped portions.

22. An optical device in accordance with claim 11 wherein the faceplate is a conductive portion.

23. An optical device in accordance with claim 11 wherein the first and second guiding portions are configured to respectively direct said first and second optical fibers across a portion of the faceplate.

24. An optical device in accordance with claim 11 wherein the first and second guiding portions are configured to respectively direct said first and second optical fibers parallel across a portion of the faceplate.

25. An optical device in accordance with claim 11 wherein the first and second guiding portions are configured to respectfully direct said first and second optical fibers in opposing directions across a portion of the faceplate.

26. An optical fiber management tool adapted to be coupled to a first end of a component board having a faceplate, the optical fiber management tool comprising:
a base portion adapted to be coupled to a surface of the faceplate, wherein the surface is external to the component board;
a first arcuate member disposed on said base portion; and
a second arcuate member disposed on said base portion and spaced from said first arcuate member, said first and second arcuate members defining a passage, said passage being configured to accommodate an optical fiber, whereby said optical fiber is bent in said passage, a radius associated with said bent optical fiber exceeding a minimum bend radius of said optical fiber.

* * * * *

UNITED STATES PATENT AND TRADEMARK OFFICE
CERTIFICATE OF CORRECTION

PATENT NO.      : 6,459,841 B1                                        Page 1 of 1
DATED           : October 1, 2002
INVENTOR(S)     : Robert Musetti et al.

It is certified that error appears in the above-identified patent and that said Letters Patent is hereby corrected as shown below:

<u>Title page,</u>
Item [75], Inventors, after "Robert Musetti" insert -- James Casciani Cupertino, CA (US) and Ralph T. Hofmeister Los Altos, CA (US) --

Signed and Sealed this

Sixth Day of May, 2003

JAMES E. ROGAN
*Director of the United States Patent and Trademark Office*